United States Patent [19]

Ishida et al.

[11] Patent Number: 4,752,055
[45] Date of Patent: Jun. 21, 1988

[54] MOUNTING MEMBER

[75] Inventors: Takeshi Ishida; Kazuhiko Kawazoe, both of Kobe, Japan

[73] Assignee: Kawasaki Jukogyo Kabushiki Kaisha, Kobe, Japan

[21] Appl. No.: 38,114

[22] Filed: Apr. 14, 1987

[30] Foreign Application Priority Data

Apr. 16, 1986 [JP] Japan .............................. 61-085882

[51] Int. Cl.⁴ .............................................. A47F 5/00
[52] U.S. Cl. ...................................... 248/298; 248/287
[58] Field of Search ...................... 248/287, 298, 295.1, 248/297.2, 660, 662, 669, 674; 410/150, 104, 105; 411/265, 284, 984, 991, 992, 993

[56] References Cited

U.S. PATENT DOCUMENTS

| | | | |
|---|---|---|---|
| 1,281,699 | 10/1918 | Swan | 248/298 X |
| 1,324,867 | 12/1919 | Wilson | 411/984 X |
| 2,610,011 | 9/1952 | Lemmerman | 248/287 UX |
| 3,038,417 | 6/1962 | Waller | 410/150 |
| 3,465,996 | 9/1969 | Wedel | 248/287 |
| 3,513,606 | 5/1970 | Jones | 248/297.2 X |
| 3,850,113 | 11/1974 | Sichak | 410/104 |
| 4,560,130 | 12/1985 | Schwartz | 248/297.2 |
| 4,602,756 | 7/1986 | Chatfield | 410/105 X |

Primary Examiner—J. Franklin Foss
Attorney, Agent, or Firm—Schwartz & Weinrieb

[57] ABSTRACT

A mounting member is improved in durability, allows an article to be mounted at a desired position of a structure and eliminates the necessity of a special mechanism for preventing rotational movement of a fastening member. The mounting member has a fattened or stepped portion formed adjacent each of a pair of transverse crossing or corner portions defined between flanges and webs thereof for preventing rotational movement of the head of a fastening member disposed within a groove defined by means of the webs and the flanges. If the head of a fastening member is inserted into the groove through means of an opening defined between the flanges and then the fastening member is rotated through means of an angle of approximately 90 degrees about its axis within the groove, the head of the fastening member is interposed between the fattened portions and prevented from rotating about its axis.

7 Claims, 5 Drawing Sheets

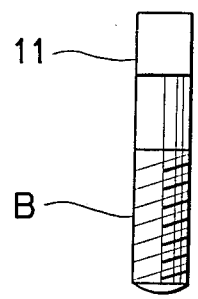
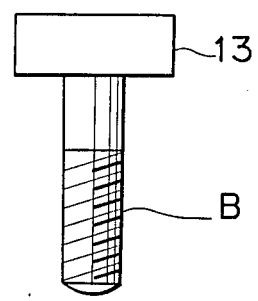
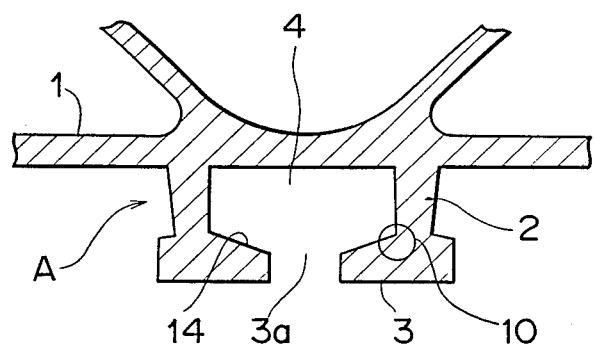

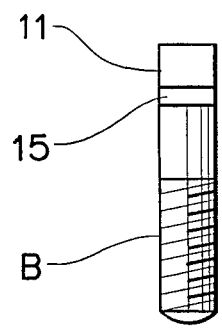
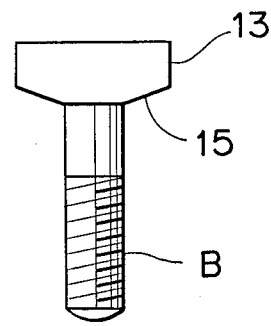
FIG. 5b  FIG. 5a
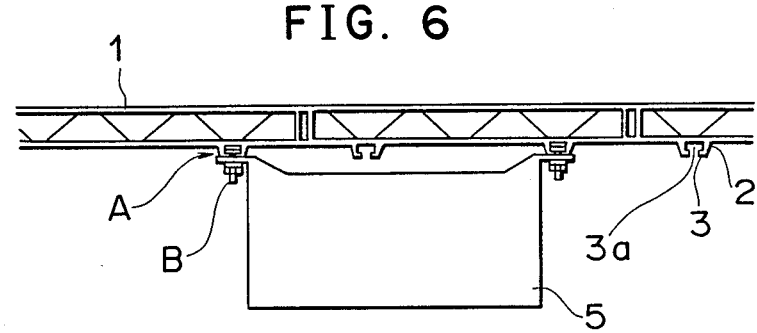
FIG. 6

MOUNTING MEMBER

FIELD OF THE INVENTION

This invention relates to a mounting member formed upon a structure for mounting an article upon the structure.

BACKGROUND OF THE INVENTION

Conventionally, a structure upon which an article is to be mounted has formed thereon upon a mounting member A as shown in FIGS. 6 and 7. The mounting member A includes a pair of webs 2 extending downwardly substantially parallel to each other from a lower surface of the structure 1, and a pair of flanges 3 extending mutually inwardly from and transversely to the lower ends of the webs 2 so as to define therebetween an opening or slot 3a. It is to be noted that the structure shown in FIG. 6 serves as the floor of a vehicle and an article is required to be mounted upon the structure.

A groove 4 having a substantially rectangular cross section is defined by and between the webs 2 and the flanges 3 of the mounting member A, as well as by the lower surface of structure 1. A head 7 of a bolt B for fastening a flange 6 of an article 5 to the mounting member A is fitted within the groove 4, and the bolt B is fastened to the mounting member A by means of a nut 8 tightened upon the bolt B.

Accordingly, when the nut 8 is tightened onto the bolt B, it is necessary to hold the bolt B from rotating about its axis. To this end, the head 7 of the bolt B is normally shaped and dimensioned so that it defines a closely toleranced fit within the groove 4. Thus, where the head 7 of the bolt B used has a regular square shape, either a method wherein the head 7 is inserted into the groove 4 from one end thereof and then slid therealong to a predetermined position of the groove 4 or another method wherein a cutaway portion 9 for admitting the head 7 of the bolt B therethrough is provided at a suitable position of the flanges 3 may be used. However, according to the former method, the head 7 of the bolt B cannot be inserted into the groove 4 if the end portion of the groove 4 is blocked, while according to the latter method, a step for forming the cutaway portion 9 is required and the article 5 cannot be mounted at the position of the cutaway portion 9.

In order to resolve such disadvantages as described above, a method as illustrated in FIG. 8 has also been devised wherein the head 7 of the bolt B has a deformed rectangular or substantially parallelogram shape that the width or the dimension of the shorter side thereof may allow the head 7 to be inserted through the opening 3a between the flanges 3 and the head 7 after having been disposed within the groove 4 may be turned through means of an angle of approximately 90 degrees about its axis in the direction indicated by the arrows within the groove 4 until it is closely fitted within the groove 4. It is self-evident that this method involves a complexly shaped head 7 of the bolt B, which results in high production costs for the bolt B.

Furthermore, in the case of the mounting member A described above, when the article 5 is secured thereto, the stress at the crossing or connecting corner portions 10 defined between the flanges 3 and the webs 2 is increased so that where the mounting member A is formed by extrusion molding of a conventionally used aluminum material, a crack C may appear at such crossing or corner portions 10 depending upon the fastening torque or the condition of the load applied thereto, which will be a significant problem with respect to the mechanical strength of the mounting member A.

OBJECTS OF THE INVENTION

It is an object of the present invention to provide a mounting member which is improved in durability.

It is another object of the invention to provide a mounting member wherein the necessity of providing of a cutaway portion thereon can be eliminated and an article can be mounted at any desired position of the structure by means of a fastening member.

It is a further object of the invention to provide a mounting member which eliminates the necessity of a special mechanism for preventing the rotational motion of the fastening member.

SUMMARY OF THE INVENTION

In order to attain the objects described above, according to the present invention, there is provided a mounting member having a pair of webs, a pair of flanges extending inwardly toward each other from and transversely to the ends of the webs with an opening defined between the inner opposed extremities thereof, the pair of webs and the pair of flanges defining therebetween a groove which has a width greater than the width of the opening and in which the head of a fastening member is loosely fitted in such a manner as to allow a pivotal motion of the fastening member therein, and a fattened or stepped portion formed adjacent each of the transverse crossing or corner portions defined between the flanges and webs, and disposed within the groove for preventing the rotational movement of the head of the fastening member disposed within the groove.

Accordingly, if the head of the fastening member is inserted into the groove through the opening between the flanges and subsequently the fastening member is turned through means of an angle of approximately 90 degrees about its axis within the groove, the head of the fastening member is tightly or closely interposed between the fattened or stepped portions formed adjacent the crossing or corner portions defined between the webs and the flanges. In this manner the rotating motion of the head of the fastening member is prevented by means of the fattened portions. In addition, the fattened or stepped portions function as a reinforcement in mechanical strength to the crossing or corner portions of the mounting member defined between the webs and the flanges against bending moments imparted to the flanges when an article is secured to the structure by means of the fastening member.

BRIEF DESCRIPTION OF THE DRAWINGS

The above and other objects, features and advantages of the present invention will become apparent from the following description and the appended claims, taken in conjunction with the accompanying drawings, in which like reference characters designate like or corresponding parts throughout the several views, and wherein:

FIGS. 3a and 3b are a front elevational view and a side elevational view, respectively, of a fastening member for use with the mounting member of FIG. 1;

FIG. 4 is a vertical sectional view of a mounting member according to another embodiment of the invention;

FIGS. 5a and 5b are a front elevational view and a side elevational view, respectively, of a fastening member for use with the mounting member of FIG. 4;

FIG. 6 is an illustrative view of a conventional arrangement of an article mounting structure and an article mounted on the structure;

DETAILED DESCRIPTION OF THE PREFERRED EMBODIMENTS

Figure 1:
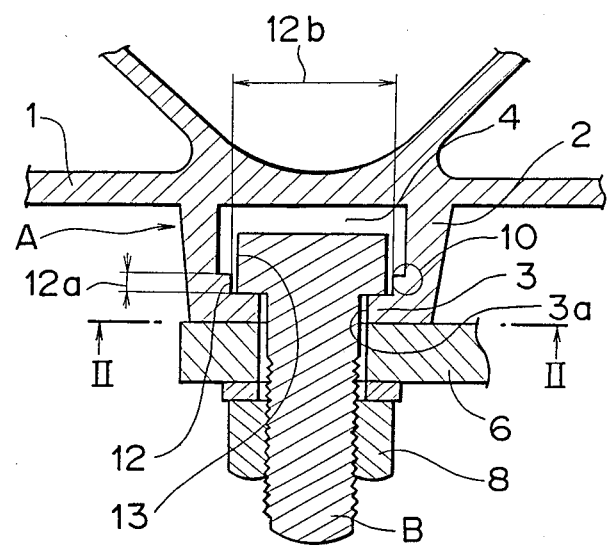
FIG. 1 is a vertical sectional view of a mounting member according to an embodiment of the present invention.
Figure 2:
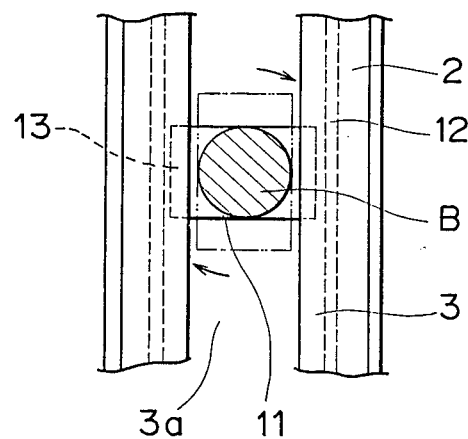
FIG. 2 is a sectional view taken along line II—II of FIG. 1.
Figure 7:
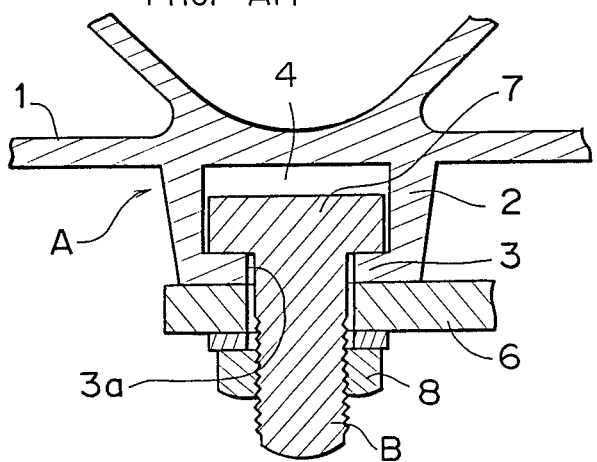
FIG. 7 is a vertical sectional view of a conventional mounting member.
Figure 8:
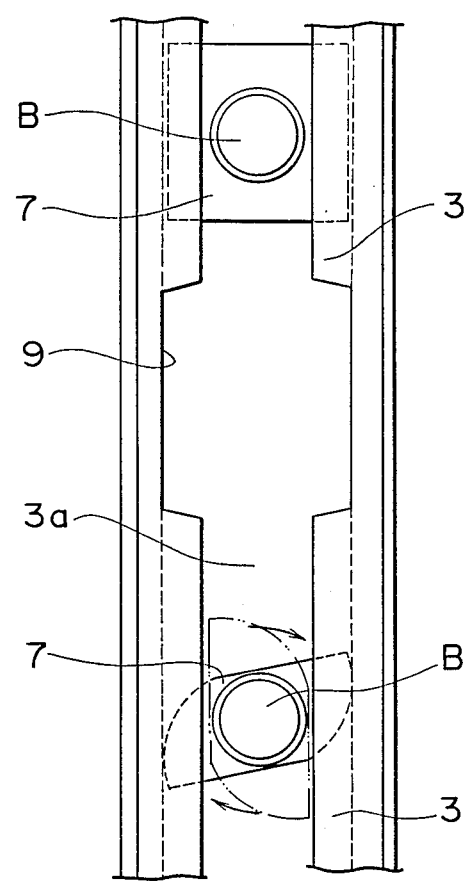
FIG. 8 is an illustrative view showing the relationship between the mounting member of FIG. 7 and a fastening member.

Referring first to FIGS. 1 and 2, there is shown a mounting member according to a first embodiment of the present invention. It is to be noted that, in FIGS. 1 and 2 and also in FIG. 3, like elements or components are denoted by like reference numerals or symbols to those of the conventional arrangement shown in FIGS. 6 to 8.

A mounting member generally denoted at A is formed upon a structure 1 and includes a pair of webs 2 and a pair of flanges 3 extending mutually inwardly from and transversely to lower ends of the webs 2. An opening 3a is defined between the flanges 3, and a groove 4 is defined by and between the pair of webs 2 and the pair of flanges 3, as well as the undersurface of structure 1.

A fastening member may be, for example, a bolt B which has a rectangular head as shown in FIGS. 3a and 3b. The bolt B shown has a narrower head portion 11 presenting a dimension of a shorter side or width of the rectangular shape of the head of the bolt B, and a wider head portion 13 presenting a dimension of a longer side or length of the rectangular shape. The narrower head portion 11 of the head of the bolt B is dimensioned so as to allow the head of the bolt B to be inserted into the groove 4 through means of the opening 3a between the flanges 3.

Meanwhile, fattened or stepped portions 12 in the form of steps or shoulders are formed in an opposing relationship to each other adjacent and along transverse crossing or corner portions 10 of the flanges 3 with respect to the webs 2 by increasing the thickness of the flanges 3 inwardly within the groove 4 and relative to the interior sidewall surfaces of the webs 2 as seen in FIG. 1. The distance 12b between opposing faces of the stepped portions 12 and the height 12a of the fattened or stepped portions 12 are dimensioned so that the wider head portion 13 of the bolt B may be inserted between the fattened portions but may be prevented from rotating about its axis by the fattened portions 12 while the height of the groove 4 above the fattened portions 12 in FIG. 1 is dimensioned so as to allow a rotating motion of the wider head portion 13 of the bolt B about its axis within the groove 4 about the fattened portions 12.

Accordingly, if the narrower head portion 11 of the bolt B is inserted into the groove 4 through means of the opening 3a defined between the flanges 3 of the mounting member A and then the bolt B is rotated through means of an angle of approximately 90 degrees in the direction of the arrows (refer to FIG. 2) about its axis, the wider head portion 13 will drop down into the space defined between the opposing faces of the fattened portions 12 formed upon the flanges 3. Consequently, the wider head portion 13 of the bolt B is prevented from rotating about its axis by means of the fattened portions 12. Accordingly, if a hole formed within a flange 6 of an article 5 is disposed about the bolt B and then a nut 8 is tightened upon the bolt B, the article 5 will be secured to the mounting member A of the structure 1.

Figure 9:
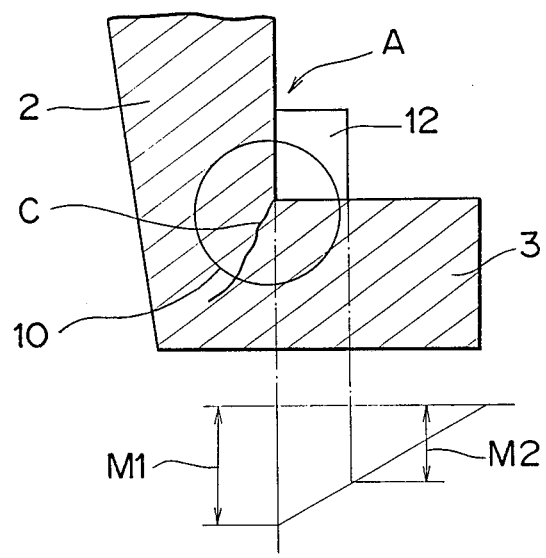
FIG. 9 is a vertical sectional, diagrammatic view illustrating a bending moment as applied to a flange of the mounting member.

Accordingly, the tendency of the bending moment impressed upon the flanges 3 will be as shown in FIG. 9, and the value M2 of the bending moment within the flanges 3 is less than the value M1 where the fattened portions 12 are not provided, which means that the mechanical strength is increased by means of the fattened portions 12.

Referring now to FIG. 4, there is shown a mounting member according to another embodiment of the present invention. Also in FIG. 4 and in FIG. 5, like elements or components are denoted by like reference numerals or symbols with respect to those of the arrangement shown in FIGS. 1 to 3 and of the conventional arrangement shown in FIGS. 6 to 9.

In the embodiment shown in FIG. 4, fattened portions 14 are formed by tapering or sloping flanges 3 of the mounting member A such that the flanges 3 may gradually increase in thickness from the inner opposing extremities thereof between which the opening 3a is defined toward the crossing or corner portions 10 defined between the flanges 3 and webs 2 of the mounting member A. Furthermore, a bolt B for use with the mounting member A has a rectangular head having a narrower head portion 11 and a wider head portion 13 and which has a pair of inclined faces 15 formed upon lower portions thereof which are contiguous to a pair of end faces thereof as shown in FIGS. 5a and 5b.

The slope of the tapered upper faces of the fattened portions 14 and the slope of the inclined faces 15 of the head of the bolt B are complementary with respect to each other so that they may suitably contact each other while they function to prevent rotational movement of the bolt B about its axis when a nut 8 is tightened thereon.

Having now fully described the invention, it will be apparent to one of ordinary skill in the art that many changes and modifications can be made thereto without departing from the spirit and scope of the invention as set forth herein.

What is claimed is:

1. A mounting member for supporting a fastening member, comprising:
   a support surface;
   a pair of webs depending from said support surface;
   a pair of flanges extending inwardly toward each other from, and transversely to, free ends of said pair of webs so as to define an opening between the inner opposed extremities thereof;
   said support surface, inner sidewall surfaces of said pair of webs, and said pair of flanges defining therebetween a groove which has a width greater than the width of said opening defined between said opposed extremities of said flanges and in which a head portion of said fastening member may be loosely disposed in such a manner as to allow rotational movement of said head portion of said fastening member therein; and stepped portions extending inwardly from said inner sidewall surfaces of said pair of webs and defined within corner portions defined between said inner sidewall surfaces of said pair of webs and said flanges for engaging said head of said fastening member at positions inward of said inner sidewall surfaces of said pair of webs so as to prevent said rotational movement of said head portion of said fastening member when said fastening member is disposed within the lower portion of said groove while advantageously permitting said pair of webs and said pair of flanges to withstand bending moments impressed thereon by loads attached to said fastening member due to the inward disposition of said head portion of said fastening member relative to said inner sidewall surfaces of said pair of webs.

2. A mounting member as set forth in claim 1, wherein:
said fastening member has a substantially T-shaped cross-sectional configuration; and
said groove and said opening together define substantially T-shaped slot means for accommodating said substantially T-shaped fastening member.

3. A mounting member as set forth in claim 1, wherein:
vertical sidewall portions of said stepped portions are engageable with vertical sidewall portions of said head portion of said fastening member for preventing said rotational movement of said head portion of said fastening member.

4. A mounting member as set forth in claim 1, wherein:
said oppositely extending flanges include upper horizontally disposed support surfaces upon which said head portion of said fastening member is supported.

5. A mounting member as set forth in claim 4, wherein:
said upper horizontally disposed support surfaces of said oppositely extending flanges have a predetermined longitudinal extent so as to define longitudinally extending rail means upon which opposite ends of said head portion of said fastening member may be supported at any one of an infinite number of longitudinally adjusted positions along said flange rail means.

6. A mounting member as set forth in claim 1, wherein:
said depending webs and said support surface are integrally formed together.

7. A mounting member as set forth in claim 6, wherein:
said inwardly disposed flanges are integrally formed together with said webs.

* * * * *